United States Patent
Shi et al.

(10) Patent No.: US 9,325,520 B2
(45) Date of Patent: Apr. 26, 2016

(54) SYSTEM AND METHOD FOR AN ASYNCHRONOUS PROCESSOR WITH SCHEDULED TOKEN PASSING

(71) Applicant: Huawei Technologies Co., Ltd., Shenzhen (CN)

(72) Inventors: Wuxian Shi, Kanata (CA); Yiqun Ge, Kanata (CA); Qifan Zhang, Lachine (CA); Tao Huang, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/325,117

(22) Filed: Jul. 7, 2014

(65) Prior Publication Data

US 2015/0074382 A1 Mar. 12, 2015

Related U.S. Application Data

(60) Provisional application No. 61/874,832, filed on Sep. 6, 2013.

(51) Int. Cl.
*G06F 9/48* (2006.01)
*H04L 12/433* (2006.01)
*G06F 15/16* (2006.01)

(52) U.S. Cl.
CPC .............. *H04L 12/433* (2013.01); *G06F 15/16* (2013.01)

(58) Field of Classification Search
None
See application file for complete search history.

(56) References Cited

U.S. PATENT DOCUMENTS

| | | | | |
|---|---|---|---|---|
| 4,454,508 A | * | 6/1984 | Grow | 370/455 |
| 5,001,472 A | * | 3/1991 | Fischer | H04L 12/417 370/450 |
| 5,422,885 A | * | 6/1995 | Nadkarni | 370/451 |
| 5,515,537 A | * | 5/1996 | Tavares et al. | 710/244 |
| 6,732,336 B2 | * | 5/2004 | Nystrom | G06F 7/5055 712/E9.063 |
| 6,850,092 B2 | * | 2/2005 | Chelcea | G06F 5/14 326/93 |
| 6,867,620 B2 | * | 3/2005 | Singh et al. | 326/121 |
| 6,882,198 B2 | * | 4/2005 | Herrera | H03K 3/356113 327/197 |
| 6,958,627 B2 | * | 10/2005 | Singh | G06F 9/3869 326/93 |
| 7,073,087 B2 | * | 7/2006 | Horie et al. | 713/600 |
| 7,490,221 B2 | * | 2/2009 | Evans et al. | 712/34 |
| 7,971,038 B2 | * | 6/2011 | Wielage | G06F 7/00 326/93 |

(Continued)

OTHER PUBLICATIONS

Ge, Yiqun, U.S. Appl. No. 14/480,541, System and Method for an Asynchronous Processor with Heterogeneous Processors.*

(Continued)

*Primary Examiner* — Alexander H Taningco
*Assistant Examiner* — Nelson Correa
(74) *Attorney, Agent, or Firm* — Slater & Matsil, L.L.P.

(57) ABSTRACT

Embodiments are provided for adding a token jump logic to an asynchronous processor with token passing. The token jump logic allows token forward jumps and token backward jumps over a cascade of token processing logics in the processor. An embodiment method includes determining, using a token jump logic coupled to a cascade of token processing logics, whether to administer a token forward jump or a token backward jump of a token signal passing through the token processing logics. The token forward jump and token backward jump allow the token signal to skip one or more token processing logics in the cascade. The method further includes monitoring, for each of the token processing logics, a polarity status of a token sense logic, and inverting the polarity status according to the determination at the token jump logic.

24 Claims, 7 Drawing Sheets

(56) References Cited

U.S. PATENT DOCUMENTS

| | | | | |
|---|---|---|---|---|
| 8,301,872 | B2* | 10/2012 | Vorbach et al. | 713/1 |
| 8,560,725 | B2* | 10/2013 | Nakayama | H04L 12/423 709/208 |
| 8,595,543 | B2* | 11/2013 | Chiang et al. | 713/502 |
| 8,706,936 | B2* | 4/2014 | Prasadh | 710/105 |
| 2003/0233622 | A1* | 12/2003 | Nystrom et al. | 716/1 |
| 2004/0056696 | A1* | 3/2004 | Herrera et al. | 327/215 |
| 2004/0151209 | A1* | 8/2004 | Cummings et al. | 370/503 |
| 2009/0119483 | A1 | 5/2009 | Singh et al. | |
| 2015/0074374 | A1* | 3/2015 | Zhang | G06F 9/3851 712/7 |
| 2015/0074376 | A1* | 3/2015 | Ge | G06F 9/30058 712/201 |

OTHER PUBLICATIONS

Sutherland, Ivan E., "Micropipelines" Communications of the ACM, vol. 32, No. 6, Jun. 1989, pp. 720-738.

International Search Report received in Application No. PCT/US14/53906, mailed Nov. 26, 2014, 8 pages.

* cited by examiner

|  | POLARITY OF TOKEN-LOGIC-0 | POLARITY OF TOKEN-LOGIC-1 | POLARITY OF TOKEN-LOGIC-2 | POLARITY OF TOKEN-LOGIC-3 | POLARITY OF TOKEN-LOGIC-4 | POLARITY OF TOKEN-LOGIC-5 | POLARITY OF TOKEN-LOGIC-6 | POLARITY OF TOKEN-LOGIC-7 |
|---|---|---|---|---|---|---|---|---|
| A NORMAL TOKEN FLOW | 0 | 0 | 0 → | 1 | 1 | 1 | 1 | 1 |
| TOKEN JUMPS FORWARD (2) → (5) | 0 | 0 | 0 | 1 → 0 | 1 → 0 | ↑1 | 1 | 1 |
| TOKEN JUMPS BACKWARD FROM (2) → (1) | 0 | 0 → 1 | 0 → 1 | 1 | 1 | 1 | 1 | 1 |

SYSTEM AND METHOD FOR AN ASYNCHRONOUS PROCESSOR WITH SCHEDULED TOKEN PASSING

This application claims the benefit of U.S. Provisional Application No. 61/874,832 filed on Sep. 6, 2013 by Wuxian Shi al. and entitled "Method and Apparatus of an Asynchronous Processor with Scheduled Token Passing," which is hereby incorporated herein by reference as if reproduced in its entirety.

TECHNICAL FIELD

The present invention relates to asynchronous processing, and, in particular embodiments, to system and method of an asynchronous processor with scheduled token passing.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an efficient token passing scheme for the asynchronous processor architecture.

SUMMARY OF THE INVENTION

In accordance with an embodiment, a method by an asynchronous processor includes passing a token signal through a token ring comprising a cascade of token processing logics, and controlling which token processing logic to process next the token signal in the cascade of token processing logics by adjusting a polarity of a token sense logic at one or more token processing logics. The controlling allows token forward and backward jumps over the one or more token processing logics in the cascade.

In accordance with another embodiment, a method performed at an asynchronous processor includes determining, using a token jump logic coupled to a cascade of token processing logics, whether to administer a token forward jump or a token backward jump of a token signal passing through the token processing logics. The token forward jump and token backward jump allow the token signal to skip one or more token processing logics in the cascade. The method further includes monitoring, for each of the token processing logics, a polarity status of a token sense logic, and inverting the polarity status according to the determination at the token jump logic.

In accordance with yet another embodiment, an apparatus for an asynchronous processor comprises a cascade of token processing logics configured to pass a token signal through the token processing logics and generate a pulse or active signal from the token signal, and an inverter coupled to the cascade of the token processing logics. The apparatus further comprises a token jump processing circuit coupled to the cascade of token processing logics and configured to control which token processing logic to process next the token signal in the cascade of token processing logics by adjusting a polarity of a token sense logic at one or more token processing logics. The controlling allows token forward and backward jumps over the one or more token processing logics in the cascade. The apparatus further comprises a memory block for each token processing logic in the cascade. The memory block memorizes a polarity status for the token processing logic.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 illustrates an embodiment of token forward/backward jumps over eight token-logics on a token ring;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
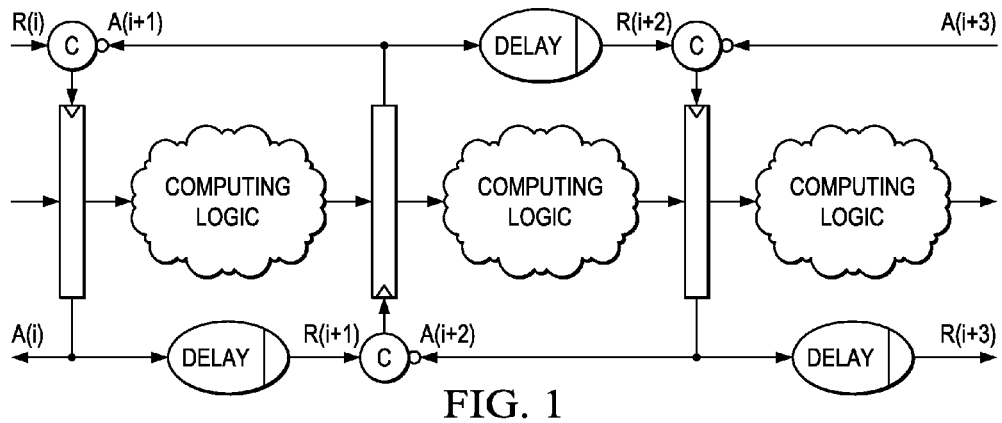
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
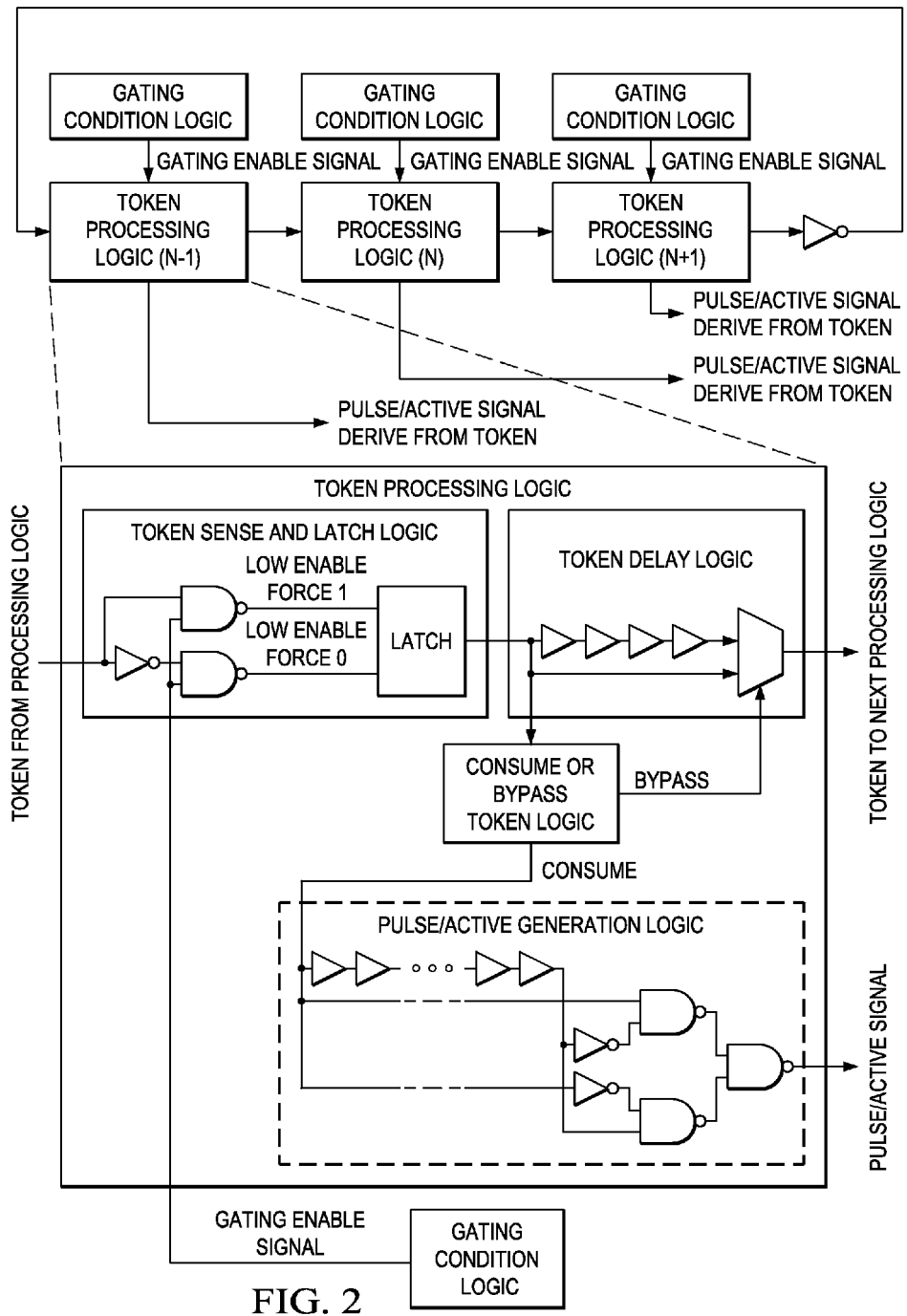
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring.

Figure 3:
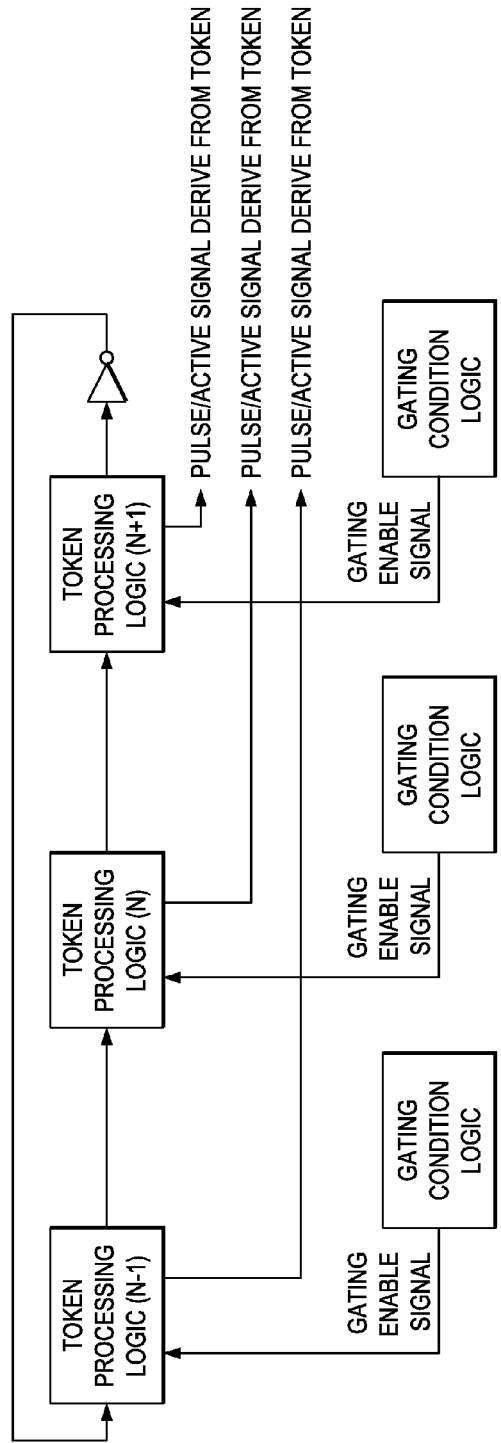
FIG. 3 illustrates a token ring based control logic.

FIG. 3 illustrates an example of a token ring based control logic, which is part of the token ring architecture above. According to this logic, the token ring consists of a cascade (series) of token processing logics and an inverter. The token processing logics process a token signal as discussed above. The inverter simply inverts the state (e.g., from 0 to 1, or 1 to 0) of the token signal from the last token processing logic before sending the inverted token signal back to the start of the ring. The token signal is referred to as an edge signal that passes through one token processing logic to the next. Additionally, an external enable signal controls when to process an incoming token signal at each token processing logic. Further, a pulse or active signal is generated from each token processing logic according to the processing of its incoming token signal, where the token signal can suffer from certain processing latency when going through a token processing logic. The pulse signal is sent from a token processing logic to a corresponding computing logic (not shown) to control, start, or allow the computing logic access to a resource associated with the token signal.

Figure 4:
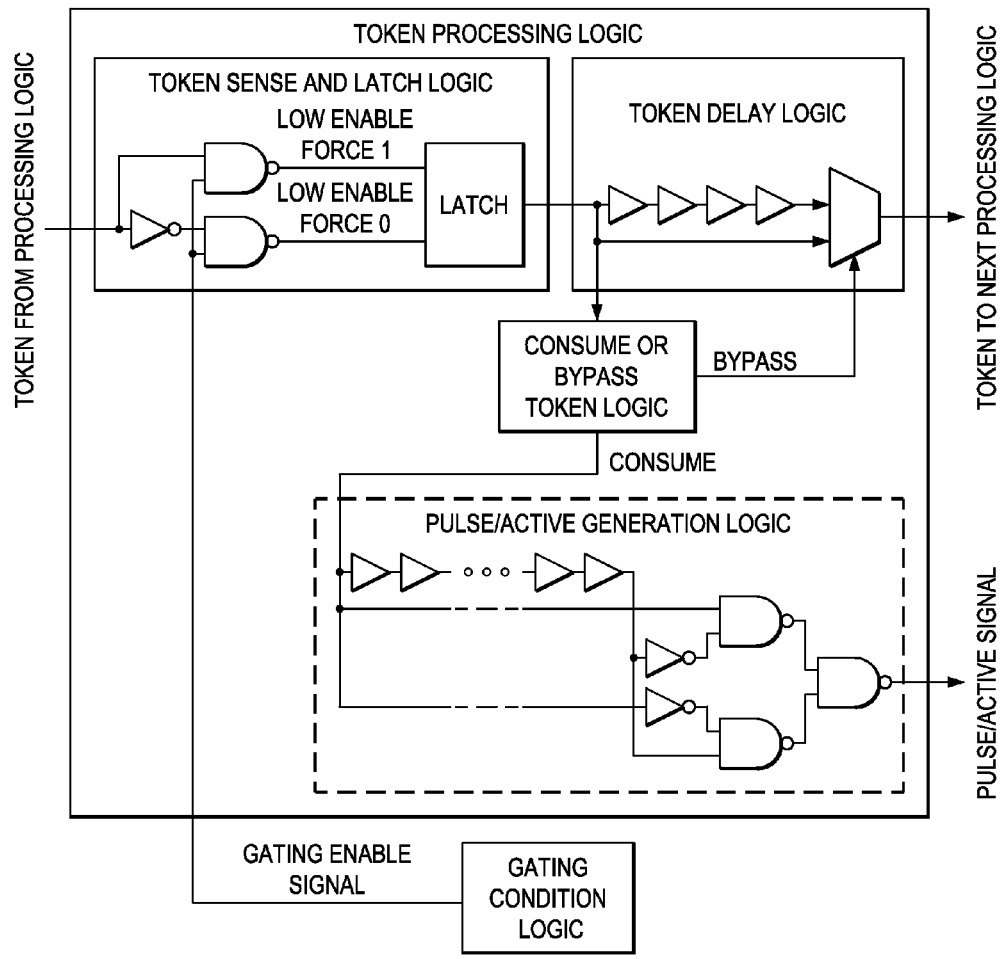
FIG. 4 illustrates a token processing logic.

FIG. 4 illustrates an example of a token processing logic, which is part of the token ring architecture above. The token processing logic can be implemented in or coupled to a processing block (e.g., arithmetic and logic unit (ALU)) or other functional calculation units of an asynchronous processor. A token processing logic can be abstracted into 3 logics: token sense & latch logic, token delay logic, and pulse or active signal generation logic.

The token processing logic includes a token sense and latch logic. The token sense and latch logic is a clockless edge-sensitive circuit with polarity memory, meaning that it does not use or operate based on a fed in clock signal and it memorizes a polarity status of the token sense logic, as described below. The operation and timing of the logic is controlled via the token signal and other means without using a clock timing. An external enable signal, referred to as a gating enable signal, to the token sense and latch logic provides a gating condition which determines whether the token signal can be processed or should be blocked upon reaching the token processing logic. If the gating condition or signal is set to a predefined high impedance signal, then the incoming token signal is blocked from being processed at the logic, whether the token reaches the logic or not. Otherwise, the token signal is processed by the logic when it arrives. The gating enable signal controls the latch part of the token processing logic to allow or block the incoming token signal. Further, when the token signal is passed, the latest polarity status is memorized in the token processing logic. Specifically, if a positive-edge token signal has passed through the token logic, then the token sense logic part becomes negative-edge-sensitive. Alternatively, if a negative-edge token signal has passed through, this token sense logic becomes positive-edge-sensitive.

The token delay logic controls whether to delay the token signal within the token processing logic or bypass the token signal and allow it to pass through the logic without delay. The consume or bypass decision is determines by an external logic, e.g., based on a table associating the tokens with computing logics that controlled by their respective token processing logics, as described above. Delaying the token signal allows the respective computing logic to process information/ access system resource while the token signal is delayed. This is referred to as consuming the token signal. When the token signal is consumed, the pulse/active generation logic is triggered to send a pulse/active signal to the respective computing logic to process information/access system resource, while the token is delayed.

The toke signal in the above architectures and logics has two limits: it must be forward-only, and it must be passed from one toke processing logic to its consecutive next one. The limitations of such a token-based pipeline include pipeline speculation where the forward-only token-system has difficulty to revoke and undo incorrectly speculated instructions. The limitations also include pipeline flush where the forward-only and consecutive-passing token system has to wait for completing token wrap-round to change program flow. Another limitation the pipeline stall, where the consecutive-passing token system cannot jump over some stalls.

In an embodiment, a universal token jump logic is introduced to allow token forward jumps and token backward jumps over the token processing logics. The universal token jump logic is configured to monitor the polarity status of each token sense logic corresponding to a token processing logic (also referred to herein as a token logic), and trigger to invert the polarity status of certain token logic(s). FIG. 5 illustrates an example embodiment of eight token logics (labeled 1 to 8) with a passing through token ring. In the case of a token forward jump, polarities of the token logics 3 and 4 are inverted from 1 (positive edge sensitive) to 0 (negative edge sensitive) before the token signal is allowed (by gating signal) to go into the two token logics. Thus, the token signal bypasses or jumps over the token logics 3 and 4, and reaches the token logic 5. In the case of token backward jump, polarities of the token logics 1 and 2 are inverted from 0 to 1 before the token signal is allowed (by gating signal) to go into the two token logics. Thus, the token signal jumps backward or returns to the token logic 1.

Figure 6:
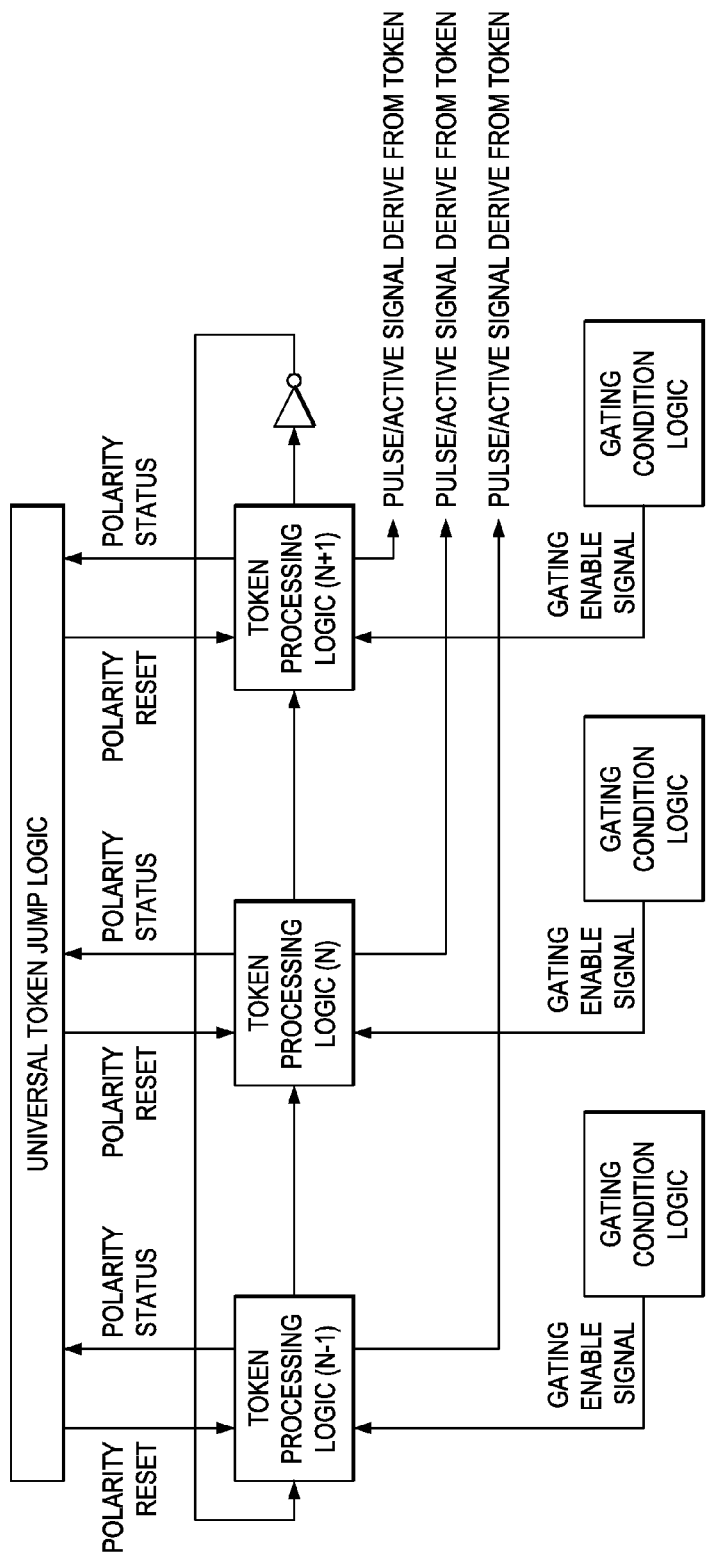
FIG. 6 illustrates an embodiment of a token jump architecture.

FIG. 6 illustrates an embodiment of a token jump architecture. On top of a token ring, a universal token jump logic is built or added to control token forward/backward jumps. The token can jump if the polarity statuses of the token processing logics are properly adjusted. For instance, prior to arrival of the token signal, the polarity status of a token logic is inverted, (e.g., from 1 or positive edge sensitive to 0 or negative edge sensitive or vice versa) allowing the token to jump over this token logic to the next token logic. The same process can be repeated for an integer N of consecutive token logics to cause the token to forward jump over the N token logics and immediately reach the N+1-th token logic in the ring. The token forward jump can resolve pipeline stall and dynamic scheduling and the like. Alternatively, after the token passes through N token logics, the polarity status of the N token logics is inverted (e.g., from 0 to 1 or from 0 to 1) causing the token signal to backward jump to the start of the N token logics. The token backward jump can resolve pipeline speculation and flush and the like.

Figure 7:
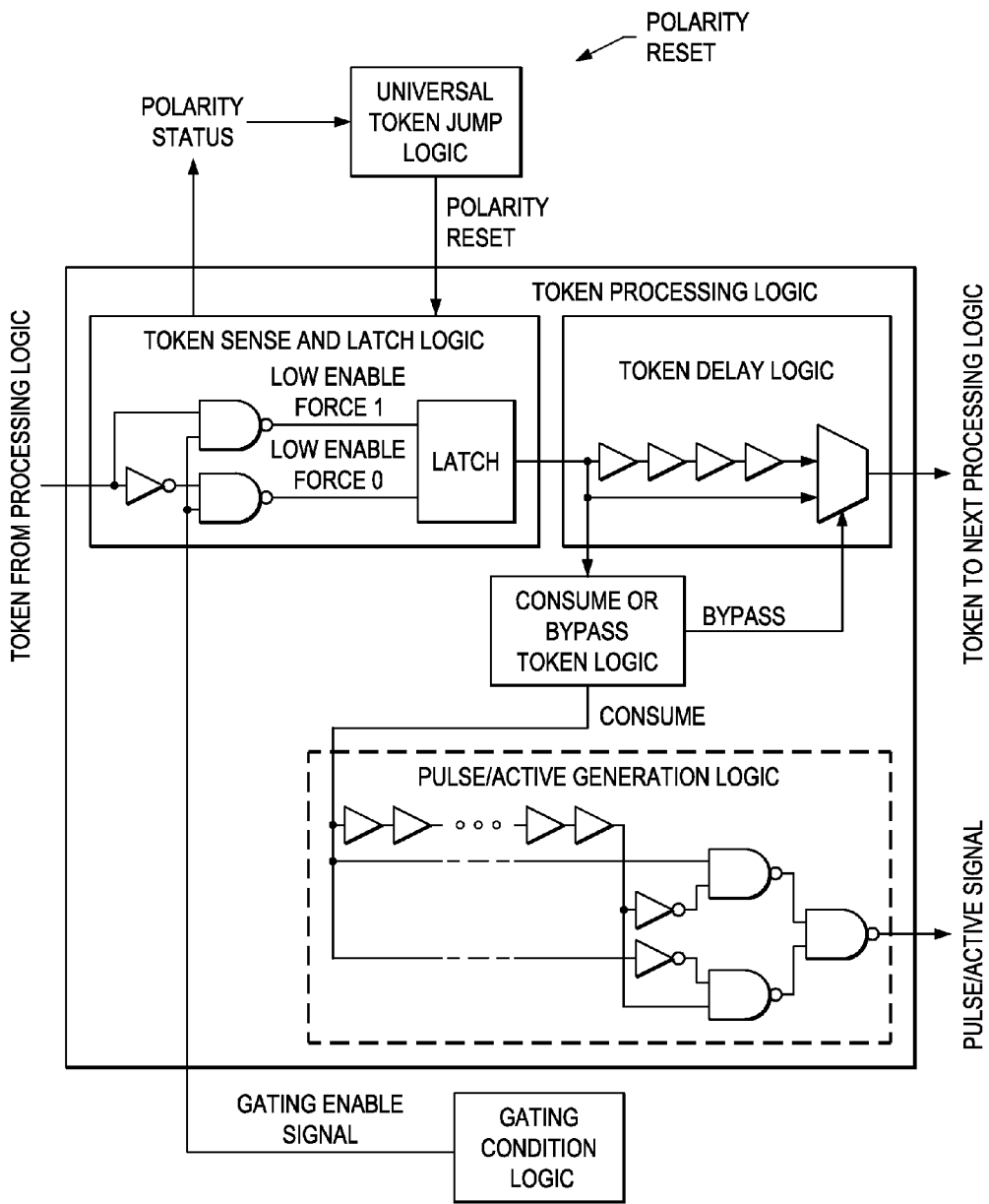
FIG. 7 illustrates an embodiment of a polarity reset logic.

FIG. 7 illustrates an embodiment of a universal token jump logic that adjusts the polarity status of a token logic from the token ring architecture to cause forward or backward jumps, as decided by the universal token jump logic. The polarity reset consists of two signals: set1_signal and set0_signal. The set1_signal is a positive-edge-sensitive enable signal. This means that if set1_signal is set, the token-processing logic's polarity is forced to "1" status, so that the token sense logic becomes positive-edge-sensitive. The set0_signal is a negative-edge-sensitive enable signal. This means that if set0_signal is set, the token-processing logic's polarity is forced to "0" status so that the token-sense-logic becomes negative-edge-sensitive.

Figure 8:
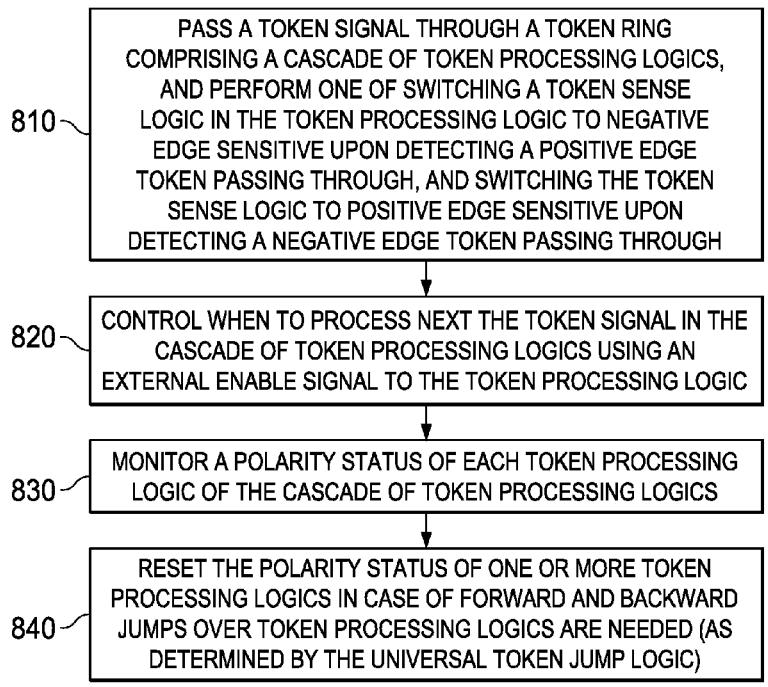
FIG. 8 illustrates an embodiment of a method for an asynchronous processor architecture.

FIG. 8 shows an embodiment method for an asynchronous processor architecture. At a step 810 of the method, a token signal is passed through a token ring comprising a cascade of token processing logics. As such, the method performs one of switching the token sense logic (in the token processing logic) to negative edge sensitive upon detecting a positive edge token passing through, and switching the token sense logic to positive edge sensitive upon detecting a negative edge token passing through. At step 820, the method controls when to process next the token signal in the cascade of token processing logics using an external enable signal to the token processing logic. The controlling includes, at step 830, monitoring a polarity status of each token processing logic of the cascade of token processing logics. At step 840, the method resets or inverts the polarity status of one or more token processing logics, in case of forward and backward jumps over token processing logics are needed (as decided by the universal token jump logic).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a asynchronous processor device, the method comprising:

passing, within the asynchronous processor device, a token signal through a token ring comprising a cascade of token processing logics, wherein the token processing logics are all located in the asynchronous processor device, and wherein the asynchronous processor device is a single physical electronic device or chipset;

storing, in a memory component, a value indicating a polarity status at each token processing logic in the asynchronous processor device, wherein the value indicating the polarity status is one of two values indicating two states of polarity;

controlling which token processing logic is next in the cascade of token processing logics within the single physical electronic device to process the token signal by changing, for one or more token processing logics, the value indicating the polarity status from a first value of the two values to a second value of the two values, wherein the token signal jumps over the token processing logics by skipping each token processing logic of which the value has been changed.

2. The method of claim 1, wherein the controlling causes the token signal to forward or backward jumps by skipping the one or more token processing logics in the cascade.

3. The method of claim 1, wherein the value indicating the polarity status is changed by applying a reset signal to set the token processing logics, and wherein the polarity reset signal is one of two signals.

4. The method of claim 3 further comprising performing one of changing the value indicating the polarity status to the first value of the two values if the reset signal is a first signal of the two signals, and changing the value indicating the polarity status to the second value of the two values if the reset signal is a second signal of the two signals.

5. The method of claim 4, wherein the value indicating the polarity status at one or more consecutive token processing logics is changed, thereby causing to restart passing the token signal at the one or more consecutive token processing logics.

6. The method of claim 4, wherein the value indicating the polarity status at one or more consecutive token processing logics is changed, thereby causing to start passing the token signal at a next token process logic to the one or more consecutive token processing logics.

7. The method of claim 1, wherein passing the token signal through a token processing logic in the cascade of token processing logics includes performing one of changing the value indicating the polarity status to the second value of the two values upon detecting the token signal to be a first defined token signal, and changing the value indicating the polarity status to the first value of the two values upon detecting the token signal to be a second defined token signal.

8. The method of claim 1 further comprising processing the token signal in a token processing logic of the cascade of token processing logics according to a gating enable signal other than the token signal for the token processing logic if the gating enable signal is set to a defined enable signal to the token processing logic.

9. The method of claim 1 further comprising blocking processing the token signal at the token processing logic upon applying a gating enable signal other than the token signal for the token processing logic if the gating enable signal is set to a predefined high impedance signal.

10. A method performed at an asynchronous processor device, the method comprising:
  storing, for each token processing logic in a cascade of token processing logics in the asynchronous processor device, a value indicating a polarity status in a memory component at each of the token processing logics, wherein the value indicating the polarity status is one of two values indicating two states of polarity, and wherein the asynchronous processor device is a single physical electronic device or chipset; and
  changing the value indicating the polarity status in one or more token processing logic from a first value of the two values to a second value of the two values thereby causing a token signal to forward or backward jump over the token processing logics by skipping one or more of the token processing logics in the asynchronous processor device.

11. The method of claim 10 further comprising forcing a forward jump of the token signal by skipping one or more token processing logics by changing the value indicating the polarity status of the one or more token processing logics to the second value of the two values upon detecting the token signal to be a first defined token signal.

12. The method of claim 11, wherein forcing the token signal to forward jump by skipping one or more token processing logics includes sending a second signal other than the token signal to the one or more token processing logics, and wherein the second signal causes the changing of the value indicating the polarity status to the second value of the two values.

13. The method of claim 12 further comprising forcing a forward jump of the token signal by skipping one or more token processing logics by changing the value indicating the polarity status of the one or more token processing logics to the first value of the two values upon detecting the token signal to be a second defined token signal.

14. The method of claim 13, wherein forcing the token signal to forward jump by skipping one or more token processing logics includes sending a first signal other than the token signal to the one or more token processing logics, and wherein the first signal causes the changing of the value indicating the polarity status to the first value of the two values.

15. The method of claim 10 further comprising forcing a backward jump of the token signal by skipping one or more token processing logics by changing the value indicating the polarity status of the one or more token processing logics to the first value of the two values upon detecting the token signal to be a second defined token signal.

16. The method of claim 15, wherein forcing the token signal to backward jump by skipping one or more token processing logics includes sending a first signal other than the token signal to the one or more token processing logics, and wherein the first signal causes the changing of the value indicating the polarity status to the first value of the two values.

17. The method of claim 16 further comprising forcing a backward jump of the token signal by skipping one or more token processing logics by changing the value indicating the polarity status of the one or more token processing logics to the second value of the two values upon detecting the token signal to be a first defined token signal.

18. The method of claim 17, wherein forcing the token signal to backward jump by skipping one or more token processing logics includes sending a second signal other than the token signal to the one or more token processing logics, and wherein the second signal causes the changing of the value indicating the polarity status to the second value of the two values.

19. An apparatus for an asynchronous processor device, the apparatus comprising:
  a cascade of token processing logics in the asynchronous processor device, wherein the token processing logics are configured to pass a token signal through the token processing logics and generate a pulse or active signal from the token signal, wherein each one of the token processing logics in the asynchronous processor device includes a token sense and latch logic with a memory component for storing a value indicating a polarity status, and wherein the asynchronous processor device is a single physical electronic device or chipset;
  an inverter coupled to the cascade of the token processing logics; and
  a token jump processing circuit coupled to the cascade of token processing logics and configured to control which token processing logic is next in the cascade of token processing logics to process the token signal by changing, for one or more token processing logics, the value indicating the polarity status from a first value of the two values to a second value of the two values, wherein the token signal jumps over the token processing logics by skipping each token processing logic of which the value has been changed.

20. The apparatus of claim 19, wherein the controlling causes token forward or backward passing through the one or more token processing logics in the cascade.

21. The apparatus of claim 19, wherein the token jump processing circuit is configured to force a forward jump of the token signal by skipping one or more token processing logics by performing one of changing the value indicating the polarity status of the one or more token processing logics to the second value of the two values upon detecting a first signal other than the token signal, and changing the value indicating the polarity status of the one or more token processing logics to the first value of the two values upon detecting a second signal other than the token signal.

22. The apparatus of claim 21, wherein the token jump processing circuit is configured to force a backward jump of the token signal by skipping one or more token processing logics by performing one of changing the value indicating the polarity status of the one or more token processing logics to the first value upon detecting the second signal, and changing the value indicating the polarity status of the one or more token processing logics to the second value upon detecting the first signal.

23. The apparatus of claim 19 further comprising a gating condition logic coupled to the cascade of token processing logics and configured to allow and block processing the token signal at the token processing logics by applying a gating signal other than the token signal regardless whether the token signal has reached the token processing logics.

24. The apparatus of claim 19, wherein a token processing logic in the cascade comprises a token sense and latch logic, a token delay logic, and a pulse or active signal generation logic.

* * * * *